Figure 1:
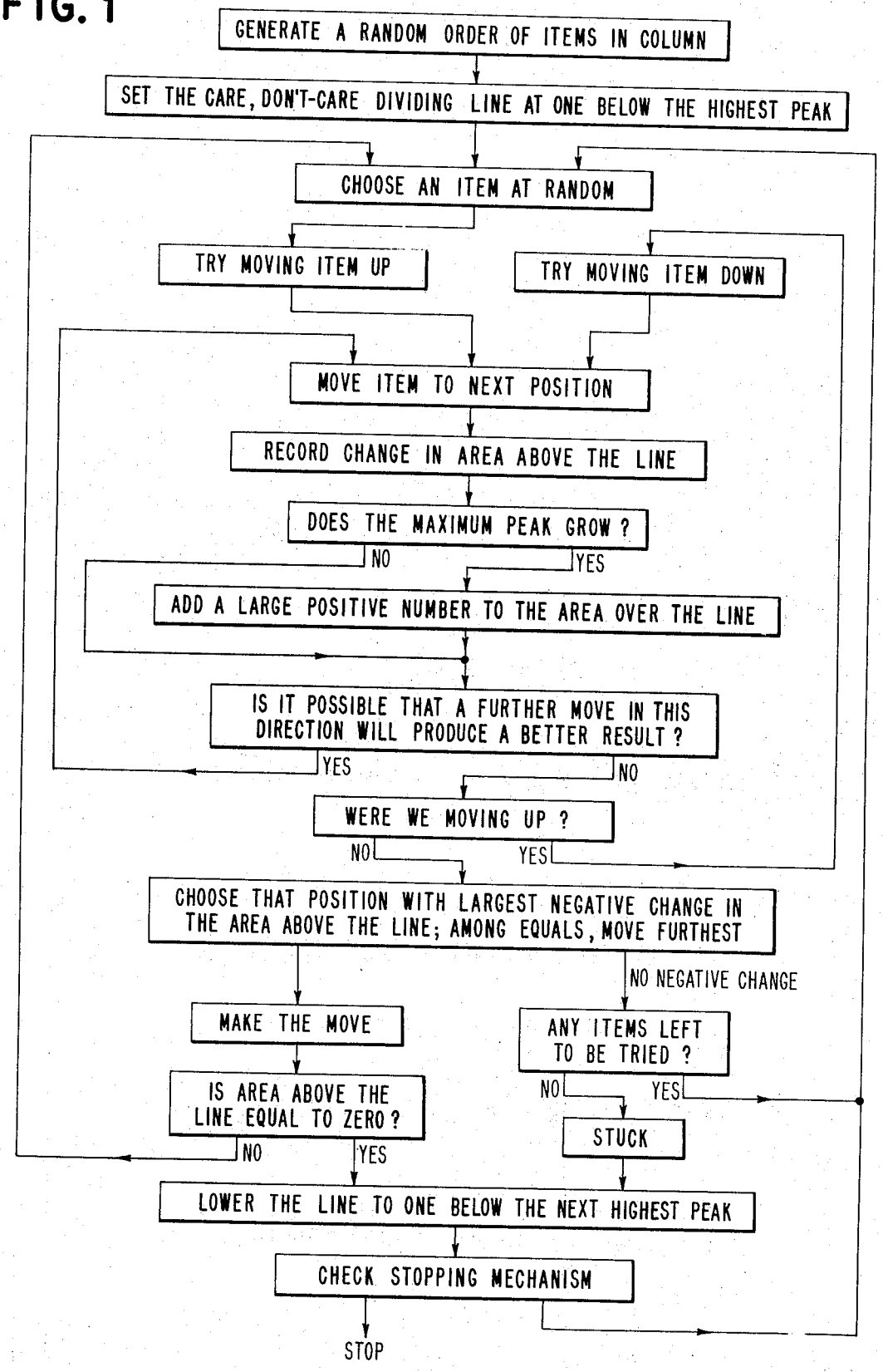
Figure 2:
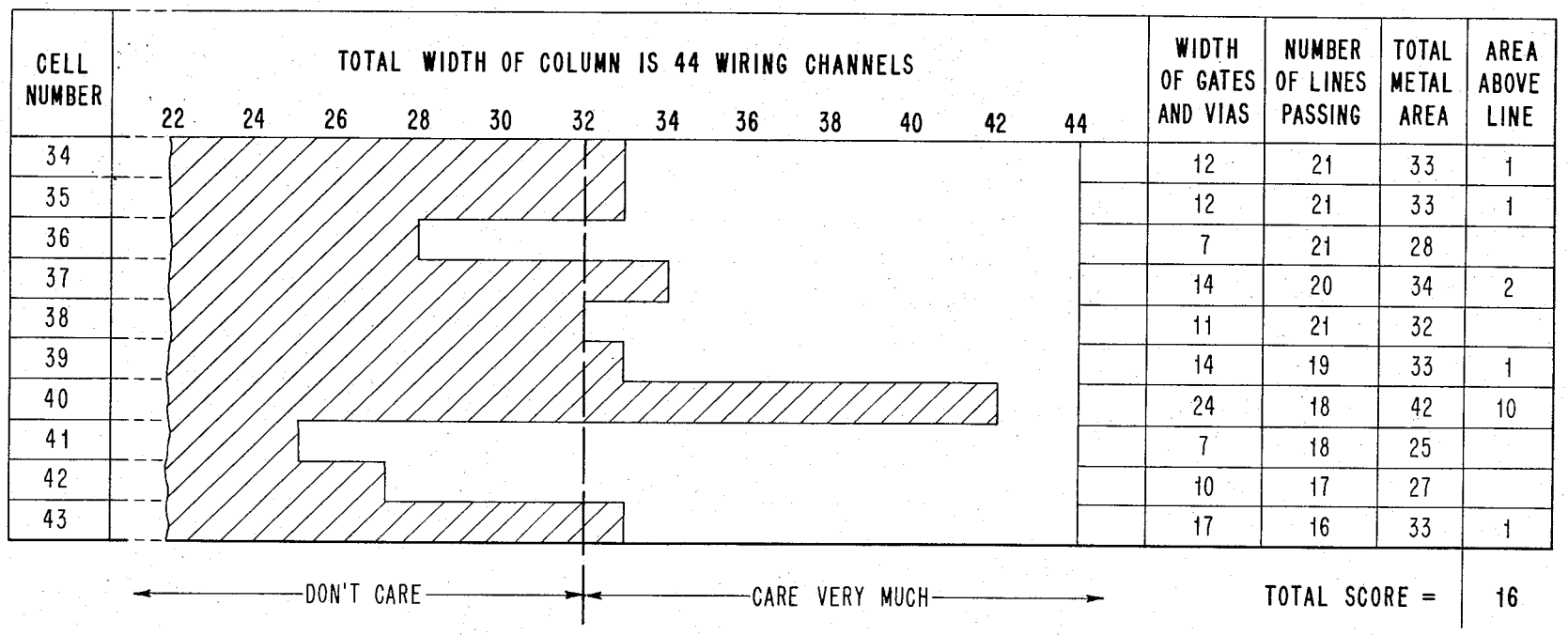

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 22, 1974

918 O.G. 1329

T918,014

NATURAL SELECTION METHOD FOR DESIGN AUTOMATION INCLUDING A MOVING LINE SCORER

Bradford Dunham, 300 Martine Ave., White Plains, N.Y. 10601, and James H. North, 1249 Baldwin Road, Yorktown Heights, N.Y. 10598

Filed June 29, 1973, Ser. No. 375,288

**Int. Cl. G06f *15/46***

U.S. Cl. 444—1

2 Sheets Drawing. 14 Pages Specification

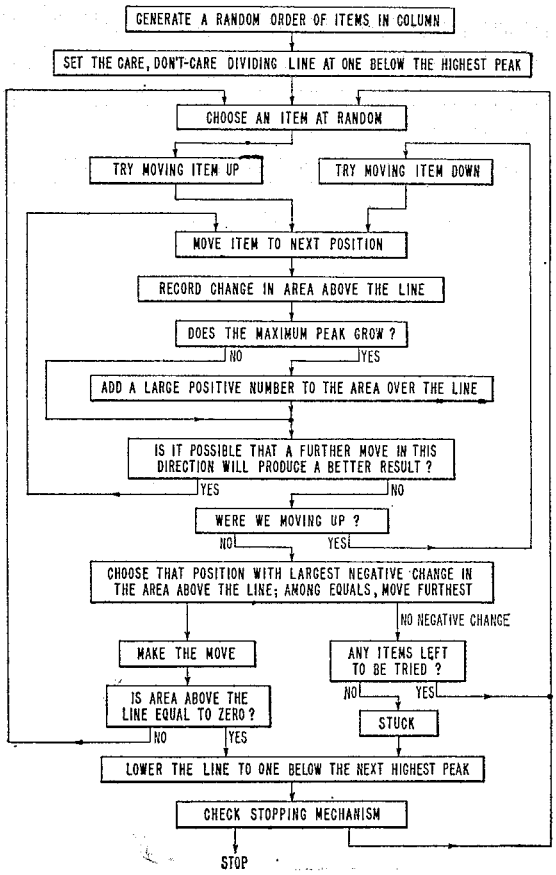

What is described is a progressive scoring mechanism for a "natural selection" design automation method which can be embodied in a computer program for optimizing a specified objective function, for example, the location of a plurality of objects. By dividing what is scored by the optimization process at a given stage on what is defined as a "care" "don't care" basis, the program can focus attention on most troublesome points without prematurely building in structure elsewhere. At a next stage, some of the material previously treated as "don't care" is now treated as "care." Thus, the method can proceed through a sequence of stages progressively dealing with more and more of the content of the problem until an appropriate stopping point is reached. In this way, not only can worst peaks be directly attacked, but also lesser peaks and valleys can be treated in due course.

| CELL NUMBER | WIDTH OF GATES AND VIAS | NUMBER OF LINES PASSING | TOTAL METAL AREA | AREA ABOVE LINE |
|---|---|---|---|---|
| 34 | 12 | 21 | 33 | 1 |
| 35 | 12 | 21 | 33 | 1 |
| 36 | 7 | 21 | 28 | |
| 37 | 14 | 20 | 34 | 2 |
| 38 | 11 | 21 | 32 | |
| 39 | 14 | 19 | 33 | 1 |
| 40 | 24 | 18 | 42 | 10 |
| 41 | 7 | 18 | 25 | |
| 42 | 10 | 17 | 27 | |
| 43 | 17 | 16 | 33 | 1 |

TOTAL SCORE = 16